US012692171B2

(12) United States Patent
Wang

(10) Patent No.: US 12,692,171 B2
(45) Date of Patent: Jul. 28, 2026

(54) METHOD OF LITHIUM SULFATE AND SODIUM (POTASSIUM) CARBONATE DIRECTLY PRODUCING LITHIUM CARBONATE AND REDUCING SULFATE RADICAL CONTENT

(71) Applicant: Ailin Dai, Shanghai (CN)

(72) Inventor: Qingsheng Wang, Shanghai (CN)

(73) Assignee: Ailin Dai, Shanghai (CN)

( * ) Notice: Subject to any disclaimer, the term of this patent is extended or adjusted under 35 U.S.C. 154(b) by 653 days.

(21) Appl. No.: 17/754,335

(22) PCT Filed: Sep. 29, 2020

(86) PCT No.: PCT/CN2020/118886
§ 371 (c)(1),
(2) Date: Mar. 30, 2022

(87) PCT Pub. No.: WO2021/063359
PCT Pub. Date: Apr. 8, 2021

(65) Prior Publication Data
US 2022/0340440 A1     Oct. 27, 2022

(30) Foreign Application Priority Data

Sep. 30, 2019   (CN) .......................... 201910942746.7

(51) Int. Cl.
*C01D 15/08* (2006.01)
(52) U.S. Cl.
CPC .......... *C01D 15/08* (2013.01); *C01P 2006/80* (2013.01)
(58) Field of Classification Search
CPC .............................. C01D 15/08; C01P 2006/80
See application file for complete search history.

(56) References Cited

U.S. PATENT DOCUMENTS

2021/0309534 A1 * 10/2021 Wang ..................... C01D 15/08

FOREIGN PATENT DOCUMENTS

| CN | 103318925 A | * | 9/2013 | |
| CN | 107986302 A | * | 5/2018 | ............ C01F 17/247 |

(Continued)

OTHER PUBLICATIONS

Translation of CN_103318925 (Year: 2013).*

(Continued)

*Primary Examiner* — Daniel Berns
*Assistant Examiner* — Joshua Maxwell Speer
(74) *Attorney, Agent, or Firm* — NKL Law; Allen Xue

(57) ABSTRACT

Traditional methods for producing lithium carbonate involves thermal precipitation of a lithium sulfate purification liquid and a sodium (potassium) carbonate purification liquid to produce crude lithium carbonate to the production of a refined lithium carbonate wet product. The employment of "reverse feeding, non-circulating mother liquor", "pre-precipitation supplementary impurity removal" and "high-efficiency desorption" can reduce industrial grade lithium carbonate sulfate anions to 0.03%, increase the main content to 2.5N, reduce battery grade sulfate anions to 0.008%, and stably increase the main content to 3N, or even reach the limit of 3.5N-4N. The high-efficiency desorption involves thermal precipitation with small temperature increases and thermal stirring washing, medium-high temperature strong desorption, and hydrocyclone separation. Impurities such as sulfate anions that are chemically adsorbed and encapsulated in the peritectic core of lithium carbonate particles can be released into deionized water, which are then effectively carried away by a hydrocyclone separation liquid phase.

6 Claims, 3 Drawing Sheets

| | $Li_2CO_3$ | $Li_3PO_4$ | LiF |
|---|---|---|---|
| Solubility, | 1.329, 20 °C | 0.022, 0 °C | 0.13, 20 °C |
| Converted into metal Li, % | 0.2497 | 0.00396 | 0.036 |

(56)　　　　　　　　References Cited

FOREIGN PATENT DOCUMENTS

| CN | 108423695 | A | 8/2018 |
|----|-----------|---|--------|
| CN | 109354044 | A | 2/2019 |
| CN | 109455744 | A | 3/2019 |
| CN | 110078099 | A | 8/2019 |
| CN | 110817906 | A | 2/2020 |
| KR | 101674393 | B1 | 11/2016 |

OTHER PUBLICATIONS

Translation of CN_107986302 (Year: 2018).*
Qin, Yu-nan. "The raw material of lithium molybdate-the technology and improvement for producing lithium carbonate"; China Molybdenum Industry; Dec. 2004; vol. 28, No. 6; pp. 26-28.

* cited by examiner

| | $Li_2CO_3$ | $Li_3PO_4$ | LiF |
|---|---|---|---|
| Solubility, | 1.329, 20 °C | 0.022, 0 °C | 0.13, 20 °C |
| Converted into metal Li, % | 0.2497 | 0.00396 | 0.036 |

METHOD OF LITHIUM SULFATE AND SODIUM (POTASSIUM) CARBONATE DIRECTLY PRODUCING LITHIUM CARBONATE AND REDUCING SULFATE RADICAL CONTENT

I. TECHNICAL FIELD

The invention relates to a method for producing a lithium salt. Particularly, the invention relates to a new method for substantially reducing the content of sulfate anions in lithium ores such as spodumene, lepidolite, zinnwaldite, primary lithium carbonate from carbonate salt lake lithium ore, amblygonite, petalite, and carbonate sedimentary rock lithium ore; intermediate lithium sulfate prepared by a sulfuric acid method, a sulfate method or a sulphide method; and various grades of lithium carbonate directly produced; and more particularly, the invention relates to a new method for substantially reducing the content of sulfate anions in lithium carbonate obtained by the thermal precipitation reaction of a lithium sulfate solution with a sodium (potassium) carbonate solution. In order to simplify the contents of the specification, a spodumene-sulfuric acid method is exemplified only for detailed illustration.

The contents of the invention, especially the similar fields to which the third technique of "high-efficiency desorption" can naturally extend, are detailed in paragraph [0081].

II. BACKGROUND

At the beginning of the last century, the industrial-grade lithium carbonate produced in Europe generally contained 0.70-0.80 wt. % impurity sulfate anions (unless otherwise stated, the percentage or proportion described herein refers to a mass percentage), equivalent to 1.035%-1.183% sodium sulfate, with an arithmetic mean of 1.109%, which appears to be much higher than that of many other water-insoluble and slightly water-soluble carbonate products.

factory with an annual output of 9000 tons in Bismarck, North Carolina, in whose industrial-grade lithium carbonate standard, the impurity sulfate anions had been substantially reduced as compared to that in the early European products, with a content of 0.35% for grade I products and 0.50% for grade II products, which, however, is still high for the medium-to-high-grade lithium-containing glass and other industries.

When the production of medium-to-high-grade lithium-containing glass such as glass ceramics requires lithium carbonate with a content of sulfate anions as low as 0.20% (i.e., Dow Corning glass standard), the Truste method is used for the purification. Such method comprises the steps of pressing carbon dioxide into lithium carbonate aqueous slurry prepared by 20 times of deionized water to acidify the lithium carbonate into a solution of 5% lithium bicarbonate in water, diluting impurity sodium sulfate in a large amount of water, and then heating the solution to decompose the lithium bicarbonate, removing carbon dioxide, and re-precipitating lithium carbonate in a low-concentration sulfate anions environment to achieve the aim of reducing the content of sulfate anions to 0.20%. However, the purification process has a long flow, and requires huge equipment investment, resulting in a greatly increased cost.

The chemical components of the industrial-grade lithium carbonate specified by the current Chinese National Standard GB/T11075-2013 are shown in Table 1 below:

TABLE 1

| | | Chemical component (mass fraction)/% | | | | | | | |
| | Main | | Content of impurities, not more than | | | | | | |
| Product brand | content of $Li_2CO_3$, not less than | Na | Fe | Ca | $SO_4^{2-}$ | $Cl^-$ | Hydrochloric acid insoluble matter | Mg |
|---|---|---|---|---|---|---|---|---|
| $Li_2CO_3$-0 | 99.2 | 0.08 | 0.0020 | 0.025 | 0.20 | 0.010 | 0.005 | 0.015 |
| $Li_2CO_3$-1 | 99.0 | 0.15 | 0.0035 | 0.040 | 0.35 | 0.020 | 0.015 | — |
| $Li_2CO_3$-2 | 98.5 | 0.20 | 0.0070 | 0.070 | 0.50 | 0.030 | 0.050 | — |

The water content of the product shall meet the requirements as shown in Table 2 below:

TABLE 2

| Product brand | $Li_2CO_3$-0 | $Li_2CO_3$-1 | $Li_2CO_3$-2 |
|---|---|---|---|
| Water content, not more than | 0.3% | 0.3% | 0.5% |

Current Nonferrous Metals Industry Standard of China for the battery-grade lithium carbonate The chemical components specified in YS/T582-2013 are shown in Table 3 below:

TABLE 3

| Content of $Li_2CO_3$ | Na | Mg | Ca | K | Fe | Content of impurities, not more than | | | | | | | | |
| | | | | | | Zn | Cu | Pb | Si | Al | Mn | Ni | $SO_4^{2-}$ | $Cl^-$ |
|---|---|---|---|---|---|---|---|---|---|---|---|---|---|---|
| ≥99.5 | 0.025 | 0.008 | 0.005 | 0.001 | 0.001 | 0.0003 | 0.0003 | 0.0003 | 0.003 | 0.001 | 0.0003 | 0.001 | 0.08 | 0.003 |

In the 1940s and 1950s, the former Lithium of America corporation invented a process for producing lithium carbonate by the spodumene-sulfuric acid method, and built a As can be seen from the chemical component tables of lithium carbonate specified in GB/T11075-2013 and YS/T582-2013, the indexes of impurity sulfate anions in $Li_2CO_3$-0, $Li_2CO_3$-1 and $Li_2CO_3$-2 lithium carbonate are 1-2 orders of magnitude higher than the indexes of other impurities Fe, Ca, Mg and Cl; in the battery-grade lithium carbonate, the indexes of impurity sulfate anions are 2-3 orders of magnitude higher than that of Mg, Ca, Fe, Zn, Cu, Pb, Si, Al, Mn, Ni and Cl, showing an even greater difference. Obviously, the reason for this is that the technical difficulty in reducing the content of sulfate anions is greater than that in reducing the content of other impurities. It should be known that it took about 40 years to reduce the content of impurity sulfate anions from 0.7%-0.8% in industrial-grade lithium carbonate produced by the earliest sulfuric acid (sulfate) method in Europe to 0.50%-0.35% in industrial-grade lithium carbonate produced by the sulfuric acid method of the former Lithium of America corporation. So far, it has taken more than 100 years to reduce the content of impurity sulfate anions to 0.20% in the common industrial-grade lithium carbonate and 0.08% in the battery-grade (also essentially an industrial-grade) lithium carbonate. Therefore, it can be imagined how the process for reducing the content of impurity sulfate anions is difficult.

Chinese Patent Application No. CN107915240A (disclosed on Apr. 17, 2018) discloses a process for producing battery-grade lithium carbonate by a sulfuric acid method, wherein the contents of the indexes of impurities sulfate anions and sodium are 0.08% and 0.025%, respectively, which are still high. If the contents can be reduced by one more order of magnitude, it will be very beneficial to improving the quality of lithium batteries.

III. SUMMARY

The present application only takes the spodumene-sulfuric acid method as an example for illustration. It should be understood that this should not be construed as limiting the protection scope of the invention, and any techniques that can be implemented based on the contents of the invention are included in the intended protection scope of the present application.

The technical problems to be solved by the invention are as follows: (1) on the basis of the current techniques for directly producing the battery-grade lithium carbonate by the thermal precipitation process with a purified lithium sulfate solution and a purified sodium (potassium) carbonate solution and the product standard YS/T582-2013, innovating some processes to substantially reduce the content of impurity sulfate anions to 0.010%-0.008% and slightly reduce the content of other impurities, thereby stably increasing the main content of the battery-grade lithium carbonate to 3N grade, and under optimized conditions, to 3.5N grade, and nearly or even finally to 4N grade (can be referred to as "quasi-high purity grade") for some products. The inventor of the present application believes that the limit of the main content of the lithium carbonate produced directly by the thermal precipitation process with lithium sulfate solution and sodium (potassium) carbonate solution may be 4N.

(2) On the basis of the current techniques for producing the industrial-grade lithium carbonate by the thermal precipitation process with a purified lithium sulfate solution and a purified sodium (potassium) carbonate solution and the product standard GB/T11079-2013, innovating some processes to substantially reduce the content of impurity sulfate anions to 0.03% for the "new zero-grade" lithium carbonate and the content of sodium and other impurities, thereby increasing the main content to 99.50%; and to substantially reduce the content of impurity sulfate anions to 0.10% for the "new first-grade" lithium carbonate, thereby increasing the main content to 99.35%. Other low-grade industrial lithium carbonates are not considered, because once the three techniques of the invention are fully implemented, no sulfate anion with a content higher than 0.10% is present in the produced industrial lithium carbonate.

The technical schemes for solving the above technical problems are as follows: according to different requirements on product quality and on the basis of the current techniques for producing the industrial-grade and battery-grade lithium carbonates, applying the corresponding combinations of the following three techniques of the invention to achieve the aims described in paragraphs [0010]-[0011]: 1, "reverse feeding without mother liquor circulation"; 2, "supplementary impurity removal by pre-precipitation"; and 3, "high-efficiency desorption". The technical schemes are detailed in sequence in following paragraphs [0013]-[0073].

To achieve the aims described in paragraphs [0010]-[0011], the first and third techniques of the invention are essential, which are applied starting from the procedure of obtaining crude lithium carbonate by a thermal precipitation reaction of a completely purified lithium sulfate solution with a completely purified sodium (potassium) carbonate solution, and ending with the procedure of obtaining various grades of refined wet lithium carbonate; the second technique of the invention is optional, which is used prior to the thermal precipitation reaction, primarily for the production of industrial-grade lithium carbonate, and optionally for the production of battery-grade lithium carbonate if necessary.

The combinations of the three techniques of the invention are as follows:

1. When the current industrial zero-grade lithium carbonate with 0.20% sulfate anions needs to be produced, the technique for removing impurities such as silicon, iron, aluminum, magnesium, calcium and heavy metals before the current thermal precipitation process remains basically unchanged, and all detection methods remain unchanged; by applying the combination of the first and second techniques of the invention, various solid lithium ores such as spodumene, lepidolite, primary lithium carbonate from carbonate salt lake lithium ore (some produced in the Grag Yer Tshwa Kha, Lung Mu Mtsho, Jieze Chaka Salt Lake of Tibet, and some stored in the Atacama salt lake of South America), zinnwaldite, phospholithite, petalite, and (future) carbonate sedimentary rock lithium ore in Yunnan province, China, (future) hard rock lithium ore in Afghanistan, and lithium-containing waste recovered from lithium batteries can be purified into a completely purified lithium sulfate solution, which is then subjected to a thermal precipitation reaction with a completely purified sodium (potassium) carbonate solution to directly produce the lithium carbonate needed.

2. When the industrial "new first-grade" lithium carbonate with 0.10% sulfate anions needs to be produced, the combination of the first technique, (or optional) second technique, and the front procedure "thermal precipitation with small temperature increases and thermal stirring washing" of the third technique of the invention is applied (see paragraphs [0024], [0027]-[0029], [0041], and [0042] for detailed description).

3. When the industrial "new zero-grade" lithium carbonate with 0.03% sulfate anions needs to be produced, the combination of the first and third techniques in combination with the second technique if necessary of the invention is applied on the basis of various impurity removal techniques for the current industrial-grade lithium carbonate.

4. When the "new battery-grade" lithium carbonate with 0.01%-0.008% sulfate anions needs to be produced, the combination of the first and third techniques (and optional the second technique for supplementation if necessary) of the invention is applied on the basis of various impurity removal techniques for the current battery-grade lithium carbonate (the selected operation parameters such as the deionized water amount, the temperature-pressure parameters, and the thermal aging duration in the third technique are more stringent than those in the production of industrial "new zero-grade" lithium carbonate) to obtain the lithium carbonate needed.

From this paragraph to paragraph [0072], the three techniques of the invention each are further detailed by taking the spodumene-sulfuric acid method for directly producing lithium carbonate as an example:

The "reverse feeding without mother liquor circulation" was invented and named by the inventor of the present application when he was in charge of the spodumene-sulfuric acid method for directly producing lithium carbonate with 0.22%-0.15% sulfate anions special for a certain enterprise in a certain chemical plant in 1978-1980 in Chengdu, China (see the annex of Chinese Patent Application No. 201810900977.7). It refers to:

1. Starting from the thermal precipitation procedure with the completely purified lithium sulfate solution and the completely purified sodium carbonate solution, the classic operation of the spodumene-sulfuric acid method invented by the former Lithium of America corporation, namely, adding a "saturated solution of $Na_2CO_3$ as a precipitant" into a "20% $Li_2SO_4$ solution" (which is referred to as "forward feeding" in the present application) as shown in FIG. 1, is reversed, and the completely purified lithium sulfate solution is added into the purified sodium carbonate solution being vigorously stirred at 90-95° C. through properly dispersed feeding points, so as to precipitate crude lithium carbonate particles with fewer sulfate anions that are chemically and deeply coated.

When the industrial "new first-grade", "new zero-grade" and "new battery-grade" lithium carbonates needs to be produced, the temperature of the thermal precipitation and stirring washing operation is increased to 104.8-120.2° C. (corresponding to a saturated steam pressure of 0.13-0.20 MPa), which is one of the innovative measures more beneficial to reducing the content of sulfate anions in lithium carbonate. See paragraphs [0014], [0027-0029], [0032] and [0041] for detailed description.

2. Moreover, instead of following the classic operation of the former Lithium of America corporation, namely, cooling the primary hot mother liquor of sodium sulfate, which has been centrifuged while hot to obtain the crude lithium carbonate, to 0° C. to −15° C. to crystallize mirabilite, and sending the secondary cold mother liquor back to the acidification material leaching process to recover lithium; another process route is developed: the secondary cold mother liquor containing lithium (converted into lithium carbonate) with a concentration up to 10-15 g/L is heated and concentrated until a sodium sulfate crystallization film is exactly formed on the liquid surface (a small excess of sodium carbonate is retained in the mother liquor, and crude lithium carbonate is gradually precipitated in the concentration process), filtered while hot to obtain the crude lithium carbonate, and sent back to the acidification material leaching process; the tertiary hot mother liquor from which the crude lithium carbonate is filtered out is combined with the new primary hot mother liquor from which the crude lithium carbonate is precipitated, and cooled to precipitate mirabilite, as such, the operations of "cooling for precipitating mirabilite-heating for precipitating the crude lithium carbonate" are alternately performed; alternatively, the secondary cold mother liquor (even the primary hot mother liquor) is directly concentrated in vacuum to recover anhydrous sodium sulfate after lithium is recovered therefrom by precipitating lithium phosphate, lithium fluoride and organic acid lithium (such as lithium stearate).

The "without mother liquor circulation" means that a large amount of lithium-containing sodium sulfate mother liquor is not sent back to the leaching process, as such, the content of harmful sodium sulfate in the leached lithium sulfate solution system is minimized, and the concentration of sulfate anions in the thermal precipitation reaction solution of the lithium carbonate is further reduced. Then, the beneficial technical effect of the "without mother liquor circulation" and the beneficial technical effect of reducing the chemical adsorption and deep coating of the sulfate (hereinafter referred to as "peritectic crystal") by the "reverse feeding" are superposed to each other; and since the concentration of sodium sulfate in the purified lithium sulfate solution is reduced a lot and the salt effect is reduced, the first pass yield of the crude lithium carbonate from the thermal precipitation is increased.

The beneficial technical effects generated by the "reverse feeding without mother liquor circulation" are realized at very low equipment and investment costs, and heretofore, there has been no economical and effective method in the art that can conveniently reduce the content of sulfate anions in lithium carbonate produced directly by the spodumene-sulfuric acid method to 0.35% or less. Moreover, this technique is still another inventive improvement created later to further substantially reduce the content of sulfate anions, namely, an indispensable supporting and foundation technique for the third technique "high-efficiency desorption" of the invention.

The "supplementary impurity removal by pre-precipitation" comprises the following three applications:

1) If it is not found until the beginning of the thermal precipitation procedure that there is a mistake in the leaching operation or the operation of removing impurities such as aluminum, iron, magnesium, calcium, and heavy metals by successive precipitation in the early stage, such that colloidal particles formed of certain impurities are not fully coagulated and thus incompletely precipitated, the impurities pass through the filter since the filter cloth is damaged and improperly placed, or the circulation of filtrate is interrupted before the residues are successfully bridged due to the improper filtration operation, and the indexes of the impurities of the purified lithium sulfate solution are detected to be unqualified, then a small amount of the purified sodium carbonate solution can be slowly added into the purified lithium sulfate solution under stirring in the "forward feeding" mode prior to the thermal precipitation operation, the addition is discontinued once white fine precipitates appear as closely detected by naked eyes and a turbidity meter, and the solution is continued to be stirred for a few minutes, and then the purified lithium sulfate solution which is discharged from a sampling port and carefully filtered is detected; if the indexes of these impurities are qualified, the addition is stopped (if the indexes of these impurities are still unqualified, a small amount of purified sodium carbonate solution is supplemented until the indexes are qualified), and the solution is continued to be stirred for more than 15 minutes to ensure that aluminum, iron, magnesium, calcium, certain heavy metal hydroxides and calcium carbonate exceeding the standard are fully coagulated and co-precipitated, and then filtered in vacuum. Since the filtrate is turbid in the initial stage, it is necessary to pump out the filtrate for circulating filtration until a filter cake is successfully bridged, and when the filtrate is observed to be completely clear, the circulating filtration is stopped. If it is observed that the obtained filter cake has a fine and smooth texture (mainly magnesium hydroxide and aluminum hydroxide), and has a small amount of crude particles (lithium carbonate), the above impurities are well purified, and the purified lithium sulfate solution which is successfully filtered is confirmed to be a completely purified solution after another detection. Compared with the procedure of sending the unqualified purified lithium sulfate solution back to the leaching process to remove the impurities sequentially, this simple error correction and rescue method leads to a more significant beneficial technique and cost effect, especially for small manufacturers with poor conditions such as equipment and management.

After completing the "supplementary impurity removal by pre-precipitation", the production of the current industrial zero-grade, "new zero-grade" and "new first-grade" lithium carbonates as well as the battery-grade lithium carbonate must comprise the thermal precipitation operation in the "reverse feeding without mother liquor circulation" mode.

2) By applying the combination of the "reverse feeding without mother liquor circulation", the "supplementary impurity removal by pre-precipitation" and the "thermal precipitation with small temperature increases and thermal stirring washing" in the "high-efficiency desorption" (see paragraph [0014]), as well as the current impurity removal techniques before the thermal precipitation procedure, the content of sulfate anions in the industrial-grade lithium carbonate produced by the spodumene-sulfuric acid method can be readily reduced to a limit of 0.35% below, and can be reduced to 0.15% (AR standard) or even 0.10% (the standard for special-grade lithium carbonate produced by the reconversion of lithium hydroxide by the spodumene-lime method in the Xinjiang Lithium Salt Plant in China; now considered to be very close to the current battery-grade standard), leading to the industrial "new first-grade" lithium carbonate.

3) In the previous production process, it is often observed that hydroxides of iron, aluminum and magnesium are flocculated and precipitated in the completely clear purified lithium sulfate solution during the concentration, which is consistent with the phenomenon recorded in the technical literature of the spodumene-lithium sulfate method for producing lithium carbonate disclosed by the former Lithium of America corporation, indicating that it is necessary to perform full flocculation, co-precipitation and multiple removal on the colloidal impurities passing through the filter and remained in the purified lithium sulfate solution. Particularly, when producing the battery-grade lithium carbonate (including other high-purity lithium carbonate varieties), if a process of circular leaching without lithium sulfate concentration is adopted, the colloid impurities of the hydroxides of aluminum, iron, magnesium and certain heavy metals may not be heated for a long time or the surface charges of colloid particles may not be eliminated and sufficiently condensed, and thus may pass through the filter, as such, the "supplementary impurity removal by pre-precipitation" technique can be adopted to remove the impurities in a supplementary way before the thermal precipitation of the crude lithium carbonate.

The "high-efficiency desorption" comprises two parts of "strong desorption" and "hydrocyclone separation". It is a powerful new technique required for further reducing the contents of sulfate anions in the industrial-grade lithium carbonate and battery-grade lithium carbonate to the maximum extent from 0.20%-0.15%-0.10% and 0.08% to 0.03%-0.02% and 0.01%-0.008%, respectively, and increasing the main contents to 99.50% and 3.5N-4N, respectively.

The "strong desorption" further comprises two parts of "thermal precipitation with small temperature increases and thermal stirring washing" and "medium-high temperature strong desorption".

The "thermal precipitation with small temperature increases and thermal stirring washing" is also an improvement based on the technical principle described in paragraphs [0057]-[0072] to the first and third techniques of the invention: throughout the process of removing sulfates in peritectic crystal by an operation system of the thermal precipitation and thermal stirring washing and the "strong desorption", adsorption and desorption are in a dynamic equilibrium, and the adsorption is exothermic and the desorption is endothermic, when the temperature is increased, the equilibrium shifts to the desorption direction (the Le Chatelier's principle), and thus the desorption is facilitated, that is to say, the desorption effect is positively correlated with the temperature, and is a continuous change process. The obvious effect of increasing the desorption of sulfate anions can be approximately predicted even if the temperatures of the thermal precipitation and thermal stirring washing are increased by 10° C. by referring to the data of the small experiment 1) in paragraph Moreover, the curvature of the lithium carbonate solubility-temperature curve is negative, and the first pass yield can be improved as the temperature is increased.

The allowable pressure of the current common jacketed reactor is mostly 0.6 MPa for the jacket, and 0.2 MPa for the reactor. Accordingly, the content of sulfate anions in the crude lithium carbonate 1 can be effectively reduced by the thermal precipitation and thermal stirring washing operation with only part of operation modes and operation parameters changed under the premise of not changing the current main equipment, which lays a better technical foundation for the subsequent "medium-high temperature strong desorption" operation. This effect can be predicted by referring to the results of the small experiment 1) in paragraph [0032]. In addition, this process improvement also reduces the amount of expensive deionized water used due to the reduced content of sulfate anions in the crude lithium carbonate 2 in the reactor. For this reason, it is recommended to operate in the range of 104.8° C. (0.13 MPa)-115.2° C. (0.18 MPa)-120.2° C. (0.20 MPa), but this is not intended to limit other equipment to operate only in this temperature-pressure range.

However, there is no need to increase the temperature excessively during the "thermal precipitation with small temperature increases and thermal stirring washing" operation. On one hand, the technical effect of reducing the content of sulfate anions is limited in the environment with high concentration of sulfate anions, on the other hand, there is no need for a jacketed reactor with a higher allowable pressure as a replacement accordingly.

The "medium-high temperature strong desorption" refers to such an inventive invention for directly producing the battery-grade or quasi-high purity-grade lithium carbonate with 0.008% sulfate anions, or even more possibly producing 4N-grade lithium carbonate with near 0.005%-0.003% (50-30 ppm) sulfate anions that: in cases where the sulfate anions in the peritectic core of the crude lithium carbonate particles are difficult to reduce by the conventional thermal stirring washing-centrifuging method, focuses on greatly increasing the temperature to intensify the thermal motion of various molecules, ions and anions in a crude lithium carbonate-2-deionized water slurry system, loosen coordinate bonds between the sulfates and lithium ions in the peritectic core of the lithium carbonate particles to substantially separate the sulfate anions from the lithium carbonate particles, and release and dissolve the sulfate anions in a large amount of deionized water; and to intensify the thermal motion of a considerable part of the other water soluble, slightly water soluble and water insoluble impurities to release, dissolve and suspend the sulfate anions in a larger amount of deionized water. The technical principle of adsorption and desorption on which it is based is detailed in paragraphs [0057]-[0072]; and the operation instructions are detailed in paragraphs [0042]-[0043].

As proved by the results of the following two easily reproducible small experiments of the "strong desorption" by gradually increasing pressure and temperature conducted by the inventor of the present application in the early years, the invention does have a strong desorption effect on the sulfate anions in the peritectic crystal of lithium carbonate particles.

1) A proper amount of tap water was added into a household pressure cooker; the industrial-grade crude lithium carbonate produced by the "reverse feeding without mother liquor circulation" process was firstly washed with 3 times of hot distilled water once to reduce the content of sulfate anions to 0.40% or less, and added into a stainless steel cup placed in the cooker, and then 3 times of distilled water was added; the stainless steel cup was covered to prevent the pollution by the tap water outside the cup, and externally heated to a pressure of 0.12 MPa (the highest pressure of the household pressure cooker, corresponding to the saturated steam pressure of about 105° C., and characterized in that a nozzle sprays steam to make a sudden sound), and static strong desorption and thermal aging were performed for 1 hour. After naturally cooling and pressure reduction, the liquid phase was removed by decantation, and 1 time of distilled water was added for the thermal stirring washing once; the refined lithium carbonate was measured for the content of sulfate anions by the chemical method, and the content of sulfate anions was substantially reduced to 0.15% or less and exceeded the expected value (0.20%). This experiment corresponds substantially to the "thermal precipitation with small temperature increases and thermal stirring washing".

2) The experiment was performed using a simple stainless steel hot-pressing cylinder at increased pressure-temperature: the industrial-grade crude lithium carbonate was firstly washed with 3 times of hot distilled water once to reduce the content of sulfate anions to 0.35%, and the strong desorption and thermal aging were performed with 6 times of distilled water under the pressure of 0.4-0.6 MPa (corresponding to a saturated steam pressure of about 146-160° C.) for 1 hour, and then 1 time of distilled water was added for stirring washing once; the fine industrial-grade lithium carbonate was measured for the content of sulfate anions by the chemical method, and the content of sulfate anions was reduced to 0.04%-0.035%, showing a precipitous drop, and was lower than the standard of 0.08% for the current battery-grade lithium carbonate, suggesting that the beneficial technical effects are significant. This experiment corresponds substantially to the "medium-high temperature strong desorption".

According to the results of the above small experiments, it can be predicted that after the addition of the "strong desorption" and "hydrocyclone separation" techniques for removing impurities, the content of sulfate anions can be further substantially reduced to 0.03%-0.02% for the industrial-grade lithium carbonate for manufacturers that produce lithium carbonate by the spodumene-sulfuric acid method with average current processes, equipment and management; and the content of sulfate anions can be completely reduced to 0.008% for the battery-grade lithium carbonate for manufacturers with advanced current processes, equipment and management. This is mainly because the "strong desorption" technical principles on which they are based are completely identical.

The "hydrocyclone separation" refers to a simple, low-investment, and easy-to-operate solid-liquid separation technique that can efficiently separate out impurities such as sulfate anions, which are separated from lithium carbonate particles in the "strong desorption" operation and dissolved and suspended in a large amount of deionized water. It is superior to various solid-liquid separation techniques using filtration devices, in that by this hydrocyclone separation technique, the majority of the particulate water-insoluble impurities that are separated and suspended in a relatively large amount of deionized water are brought out directly with the rotating flowing liquid phase; while in the solid-liquid phase separation by techniques using filtration devices, most of the particulate water-insoluble impurities will be trapped in the solid-phase lithium carbonate, failing to live up to the beneficial technical effects of the "strong desorption".

The schemes of the invention for solving the technical problems is further, systematically and completely described in the following:

(1) For the direct production of the current industrial zero-grade, "new zero-grade" and "new first-grade" lithium carbonates and battery-grade lithium carbonate by adopting a thermal precipitation method with a lithium sulfate solution and sodium carbonate solution (after the "high-efficiency desorption" technique is applied, industrial second-grade and first-grade lithium carbonates have no meaning and value), the current techniques for removing impurities such as silicon, aluminum, iron, magnesium, calcium, heavy metals and magnetic metals before the thermal precipitation process of a manufacturer remain basically unchanged; the "supplementary impurity removal by pre-precipitation" technique of the invention can be used for supplement; the current techniques for drying, crushing, metering and packaging the refined wet lithium carbonate also remain unchanged; and all detection methods remain unchanged.

(2) The sodium carbonate in thermal precipitation process is 5% excess, that is, equivalent ratio of sodium carbonate:lithium sulfate=1.05:1.00, is relatively moderate. This is to reduce the adsorption capacity of the lithium carbonate particles to sulfate anions during the thermal precipitation reaction and to increase the first pass yield of the lithium carbonate. When used in the "cooling for precipitating mirabilite-heating for precipitating crude lithium carbonate" operation of the "without mother liquor circulation" process, the above formulation enables more crude lithium carbonate to precipitate automatically and the non-amphoteric metal element impurities in the mother liquor system to be brought out as compared to the equivalent feeding.

(3) The completely purified lithium sulfate and sodium carbonate solutions must be subjected to the thermal precipitation and thermal stirring washing and the subsequent related operations in the "reverse feeding without mother liquor circulation" mode.

(4) The operations of the thermal precipitation process are substantially modified, that is, instead of pursuing the obtainment of crude lithium carbonate particles with large particle size, we will try to obtain those with small particle size, and move the thermal aging duration backward to the "medium-high temperature strong desorption" process to be completed together. This is to lay a foundation for the "medium-high temperature strong desorption" process to effectively release impurities such as sulfate anions which are formed and deeply coated in the initial stage of the thermal precipitation reaction, and the technical principle on which the improvement is based is detailed in paragraphs [0069]-[0072].

(5) The "thermal precipitation with small temperature increases and thermal stirring washing" operation is performed as follows: the completely purified sodium carbonate solution is added to the reactor and heated, a manhole on the reactor is covered, and the reactor is sealed after air in the reactor is completely driven out; when the reactor is heated to a selected temperature, the stirrer is started and is kept working effectively, the completely purified lithium sulfate solution is sprayed into the reaction in a mist form under the pressure of 0.1-0.3 MPa through pressurized sprinklers arranged at multiple points (for producing lithium carbonate with 0.008% sulfate anions, the lithium carbonate with small particle size needs to be obtained in the procedure firstly, and is sprayed at a higher speed under the pressure of 0.3 MPa). Once the feeding is completed, the reactor is de-pressurized (a pipeline should be connected to recover steam heat), after which the reaction solution is immediately discharged, and centrifuged and rinsed to obtain crude lithium carbonate-1.

(6) The crude lithium carbonate-1 obtained by the thermal precipitation is immediately transferred while hot into a reactor which has been added with deionized water with selected times, such as 3-4-5 times for the industrial-grade lithium carbonate and 5-6 times for the battery-grade lithium carbonate, and heated to 90-95° C. with a stirrer started; a manhole is covered, with the heating continued, the reactor is sealed after air in the reactor is completely driven out, subjected to the thermal stirring washing for 15 minutes after being heated to the same temperature as that of the thermal precipitation reaction in paragraph [0041], and de-pressurized (the pipeline is preferably connected to recover steam heat), after which the reaction solution is discharged, and centrifuged and rinsed to obtain industrial-grade crude lithium carbonate-2 and battery-grade crude lithium carbonate-2 with the content of sulfate anions controlled to be 0.30%-0.20% and 0.15%-0.10%, respectively, for later use.

(7) The deionized water with selected mass multiples of the crude lithium carbonate-2 is pumped into a medium-high temperature strong desorption reactor, and stirred at low speed, and the crude lithium carbonate-2 is added; the mixture is heated to a selected temperature such as 159-170° C. (corresponding to the saturated steam pressure of 0.6-0.8 MPa), and subjected to the strong desorption and the thermal aging for 1 hour or more under the conditions of the low-speed stirring and the low-speed motion state of a slurry solid phase, so that water-soluble impurities mainly comprising sodium sulfate, and slightly water-soluble and water-insoluble impurities in the peritectic core of the lithium carbonate particle are released in the deionized water, and lithium carbonate crystals with small particle size are recrystallize into large crystals with the content of sulfate anions of 0.03%-0.02% (for the industrial "new zero-grade" lithium carbonate) or 0.010%-0.008% (for the "new battery-grade" lithium carbonate) under the condition that the concentration of sulfate anions is far lower than the thermal precipitation reaction concentration.

(8) After the content of sulfate anions is detected to be qualified, the medium-high temperature strong desorption reactor is de-pressurized (a pipeline should be connected to recover steam heat), and when the pressure is reduced to 0.05-0.06 MPa, the stirring speed is increased to maintain a strong stirring state of the slurry, the slurry is pumped into a hydrocyclone separator with the speed controlled to continuously separate the liquid phase from the solid phase; the separated liquid phase with the released (slightly) water soluble and water insoluble particulate impurities is sent back to the leaching process to recover lithium, and part of the liquid phase can be used to clean the filter cloth and equipment; only part of the liquid phase which is sufficiently coagulated and subjected to fine filtration is allowed to be involved in the thermal stirring washing of the crude lithium carbonate-1 to produce industrial-grade products, and is prohibited in the subsequent processes. The solid phase only needs to be centrifuged and rinsed (if necessary, the solid phase is subjected to the thermal stirring washing once for the battery-grade lithium carbonate) to obtain the wet fine industrial-grade lithium carbonate with the content of sulfate anions reduced to 0.03%-0.02% and the wet fine battery-grade lithium carbonate with the content of sulfate anions reduced to 0.008% or less.

(9) In cases where a pipeline desorber is adopted to automatically and continuously perform the "medium-high temperature strong desorption" operation, the pressure of the slurry is reduced to 0.05-0.06 MPa through a de-pressurized storage tank with a stirrer and a cooling water jacket, and the slurry is pumped into the hydrocyclone separator for the separation operation with the speed controlled.

One of the methods for determining the end point of the "medium-high temperature strong desorption" operation is as follows: sampling is performed through a continuous sampling port specially arranged in the desorber, the content of sulfate anions in the liquid phase is measured by intermittent and repeated sampling detection or continuous online detection, the content of residual sulfate anions of the solid-phase lithium carbonate (dry basis) is calculated by a program control computer according to the obtained content data, the amount of the crude lithium carbonate-2 added and the content of sulfate anions therein, and the amount of the deionized water added, if it is confirmed to be qualified, the desorption end point can be determined.

Specific remarks regarding the technical parameters of the "high-efficiency desorption" are as follows: various operation parameters, such as water amount used for firstly washing the crude lithium carbonate-1, times of the first washing, control indexes of the content of sulfate anions in the crude lithium carbonate-2 for the "thermal precipitation with small temperature increases and thermal stirring washing" procedure; water amount used for desorption, control indexes of the saturated steam pressure-temperature of a desorber, rotating speed for stirring or rotating speed of the desorber, desorption and thermal aging duration and the like for the "medium-high temperature strong desorption" procedure; and discharge pressure for the "hydrocyclone separation" procedure, are set according to the grade of lithium carbonate to be produced, quality requirements of orders, component characteristics of starting materials, yield and cost control, safety production management and other factors; the parameters exemplified in the summary and the detailed description of the invention are considered as a whole instead of a fixed range of rigid parameters, and they can be flexibly adjusted and controlled in the actual practice; therefore, these parameter sets are all included in the protection scope of the invention.

For example (but not limited to), for producing the industrial-grade lithium carbonate, the amount of the deionized water can be distributed as appropriate according to a ratio of 2.5:5:0.5 or 1.5+1.5:5.5:0.5 for the "thermal precipitation with small temperature increases and thermal stirring washing", "medium-high temperature strong desorption", and centrifuging and rinsing, and the total amount of the deionized water used in the three procedures being 8-9 times the amount of the finished lithium carbonate is sufficient; and for producing the battery-grade lithium carbonate, the amount of deionized water can be distributed according to a ratio of 2.5:6:0.5 or 1.5+1.5:6.5:0.5, and the total amount of the deionized water used in the three procedures being 9-10 times the amount of the finished lithium carbonate is sufficient.

For another example (but not limited to), temperature-saturated steam pressure in a desorber: although the desorption effect is positively correlated with temperature-pressure, that is, the higher the temperature-pressure, the easier and more numerous the separation of the sulfate anions and other impurities, and the shorter the time required for the separation; however, in this case, the equipment and maintenance costs will be higher, and the management of the enterprise will be more complex. Taking factors such as product quality requirement, technical effect, investment amount, production capacity, cost, safety management of pressure vessels, and current equipment conditions of various manufacturers into account comprehensively, it is recommended that for producing the industrial "new zero-grade" and "new first-grade" lithium carbonates, a pressure of 0.5-0.6 MPa is adopted, although it is not limited but unnecessary to exceed 0.6 MPa, only in the automatic and continuous operation using a pipeline desorber, a pressure more than 0.8 MPa can be adopted, although it is not limited but unnecessary to exceed 1.0 MPa; and it is recommended that for the battery-grade lithium carbonate, a pressure of 0.7-0.8-1.0 MPa is adopted, although it is not limited but unnecessary to exceed 1.0 MPa, only in the automatic and continuous operation using a pipeline desorber, a pressure more than 1.0-1.2 MPa can be adopted, it is not limited but unnecessary to exceed the current low pressure/medium pressure vessel limit of 1.6 MPa.

Therefore, in paragraphs [0028], [0032]-[0033], [0041]-[0045], [0048], [0049], and [0053]-[0054], various technical parameters that are moderately adjustable and related to the "high-efficiency desorption" technique should be included in the intended protection scope of the present application.

The liquid phases of water-soluble impurities mainly comprising sodium sulfate, water slightly-soluble impurities, other colloidal impurities and other particulate water-insoluble impurities which are separated from the crude lithium carbonate-2 particles are separated by a "hydrocyclone separator", which is a good selection of solid-liquid separation equipment for large-scale industrial, automatic and continuous production in the "medium-high temperature strong desorption" procedure; if a liquid-solid phase separation with filter cloth (such as centrifugal separation) is adopted, a lot of suspended particulate water-insoluble impurities will be mixed into the solid phase, such that the otherwise excellent impurity removal effect of the "medium-high temperature strong desorption" is substantially reduced.

The optional structure types of the desorber used in the "medium-high temperature strong desorption" comprise: 1) a pressure reactor with a low-speed stirring and a heating and cooling jacket, standard equipment; 2) a low-rotating-speed spherical or horizontal cylindrical desorber, standard equipment or self-design; or 3) a pipeline desorber mostly suitable for manufacturers with large design capacity, self-design; 4) any types of desorber adopting dividing-wall heating and cooling instead of direct steam heating to avoid polluting the slurry.

As the inner surface structure material of the desorber used in the "medium-high temperature strong desorption" procedure contacting the material, the titanium plate composite material is preferable, followed by the stainless steel plate made of 0Cr18Ni9Ti or 0Cr18Mo2Ti. However, in the production of the battery-grade lithium carbonate, if a stainless steel material is to be selected for the inner surface structure material of the desorber, it is necessary to make a small pressure reactor with pressure resistance of 1.6 MPa due to the strict restriction of the content of magnetic metal chromium in the product of less than or equal to 3 ppm, and a long-time (100 hours or more are recommended) soaking test is performed firstly on lithium carbonate slurry under the condition of a saturated steam pressure of 0.8-1.0-1.2 MPa in the reactor to detect the chromium leaching amount: as long as the chromium content of the lithium carbonate after the soaking test is increased by 1 ppm compared with that before the soaking, the material of this batch cannot be selected, and another selection is needed. In addition, the soaking test is also required for lithium sulfate obtained from fluorine (chlorine)-containing starting materials such as fluor-lepidolite, but this is to measure the corrosiveness of fluorine (chlorine) to the two materials, and if corrosion exists, a composite steel plate lined with polytetrafluoroethylene (the allowable temperature for long-term use is −180° C. to 260° C.) is selected as the structure material.

For the scheme using the design of glass lining in the inner wall of the desorber, it is necessary to perform a test with material firstly to detect the dissolution amount of elements such as boron, aluminum, silicon, lead, and antimony in the glass lining under the conditions of alkaline lithium carbonate slurry, long time (100 hours or more are recommended), high temperature (corresponding to the saturated stream pressure of 0.8-1.0-1.2 MPa) and low-speed stirring: once the above elements and others soluble in alkali and limited to indexes of impurities of the battery-grade lithium carbonate dissolve out and lead to the material unqualified, the formula comprising the glass lining in the inner wall should be rejected, and another selection is needed. A reactor with glass lining in the inner wall is not suitable for the lithium sulfate obtained from fluorine-containing starting materials such as fluor-lepidolite.

For the "hydrocyclone separation", a hydrocyclone separator of standard equipment or self-design is used, the material of which is selected as the same as the inner surface structure material of the desorber used in the "medium-high temperature strong desorption" procedure contacting the material.

It is preferable to use the same material as the inner wall of the main equipment for the pipe fittings of all procedures of the "high-efficiency desorption".

The technical schemes of the invention have the following beneficial effects: by using a relatively simple technical scheme, the content of impurity sulfate anions and other impurities in the industrial-grade and battery-grade lithium carbonates directly produced by the lithium sulfate solution and the sodium (potassium) carbonate solution extracted from various lithium ores and sulfur-containing starting materials referred to in paragraph [0001] can be substantially reduced at low production costs, and the main content of the two types of lithium carbonates is improved; the otherwise large and even huge quality, cost and price difference of the industrial-grade and battery-grade lithium carbonates directly produced by a lithium ore-sulfuric acid method, a sulfate method and a sulfur compound method and the high-purity grade lithium carbonates produced by various methods are substantially reduced, with the boundary blurred, so that the technical standard of all grades of lithium carbonates to be modified in the future can be simplified. The beneficial effects are very beneficial to promoting the rapid development of high-end lithium industries such as lithium batteries, and are very beneficial to enabling the long-term combination of lithium ore salt with the high-quality and low-price salt lake lithium salt.

The technical principle on which the "reverse feeding without mother liquor circulation" and "high-efficiency desorption" are based is described in paragraphs [0057]-[0072].

Paragraphs [0002]-[0008] have pointed out the long-existing problem that the impurity sulfate anion in lithium carbonates produced directly by the lithium ore-sulfuric acid method and the sulfate method is too numerous to remove. The essential reason is that lithium ions are likely to form coordinate bonds with oxygen acid anions containing silicon, carbon, and sulfur due to their structural characteristics, that is, sulfate anions are likely to be chemically adsorbed to crude lithium carbonate during the thermal precipitation to form coating (peritectic crystal), so that the sulfate anions are difficult to wash out. Particularly, the adsorbed sulfate anions grow with the crude lithium carbonate particles in the initial stage of the thermal precipitation, and will even be deeply coated, which is extremely difficult to remove according to the current thermal stirring washing method, causing the greatest harm. Although the alkali and alkaline earth metal elements do not have as great polarizability as the transition elements, they can form a coordination complex with a coordinating atom as a central atom, particularly a lithium atom having the smallest radius among all metal elements, which is advantageous for forming a coordination complex having a slightly larger stability constant. A sulfate anion has two coordinating oxygen atoms, so that the sulfate anion is conducive to forming a coordination complex with a slightly large stable constant with a lithium ion in lithium carbonate, and the generated coordination bond has slightly high energy and stronger chemical adsorption force (the principle is also suitable for carbonate and silicate anions).

According to the Langmuir theory of solid surface adsorption in physical chemistry, when crude lithium carbonate particles are precipitated and washed with a lithium sulfate solution and a sodium (potassium) carbonate solution at a relatively high temperature of 90-95° C., the physical adsorption force based on van der Waals force is weak. Since two coordinating oxygen atoms in the sulfate anion can be used as coordination sites of the coordination complex, the probability of generating a sulfate anion coordination complex with a slightly large stability constant is very high under the condition that the concentration of the sulfate anion is high when the crude lithium carbonate is precipitated. The adsorption of the sulfate anions to the surface of the crude lithium carbonate particles is mainly chemical adsorption, wherein the adsorbent is lithium ions, and the adsorbate is sulfate anions. The other characteristics of the chemical adsorption are as follows: a. The selectivity is very high. During the thermal precipitation, the lithium carbonate particles have strong adsorption force for both sulfate and carbonate anions, and whether the sulfate anion or the carbonate anion is more likely to be adsorbed or adsorbed in larger amounts mainly depends on the concentration of the adsorbate, because the Freundlich adsorption formula shows that the adsorption capacity increases with the increase of the adsorbate concentration. b. Only single-layer adsorption occurs. This is because the chemical adsorption is accomplished by forming a new chemical bond with the adsorbate through the residual bond force of the molecules on the surface layer of the solid molecules, and when the surface of the solid molecules is saturated with the adsorbate, it will no longer absorb the adsorbate with the same charge to form the second adsorption layer. c. The adsorption is exothermic and not easy to reverse, that is, the desorption is difficult to take place and is endothermic. The chemical adsorption also promotes the coating of sulfate anions in the crystal growth process, because once the sulfate anions are adsorbed on the lithium carbonate particles and are not easy to desorb, lithium carbonate molecules coordinated with the sulfate anions are then adsorbed outside to form the coating of the sulfate anions, namely peritectic crystals, so that the conventional washing method is difficult to desorb and remove the sulfate anions in the lithium carbonate particles, and the higher content of the sulfate anions is inevitable.

In terms of the two factors of the adsorbate and the adsorbent, the former has greater influence on the content of the impurity sulfate anions in the lithium carbonate as proved by the production practice.

According to the above theoretical analyses, for the purpose of substantially reducing the content of the impurity sulfate anions, it is the most important to reduce the concentration of the adsorbate sulfate anions in a thermal precipitation reaction system as much as possible, and adopt the "slowing, heating and aging" operation in a thermal stirring washing process to obtain refined lithium carbonate particles with large particle size, so as to reduce the sulfate anions in the peritectic crystal; more importantly, it is necessary to find a simple, low-cost and powerful desorption technique to release the sulfate anion in the peritectic crystal which is difficult to remove by the current thermal stirring washing-centrifuging method.

Based on the above knowledge, the inventor of the present application proposed and led the implementation of the technical scheme of the "reverse feeding without mother liquor circulation" in 1978-1980. The "reverse feeding" is derived according to the principle that the chemical adsorption has the characteristics of selective adsorption, single-layer adsorption and difficult desorption: in the initial stage of feeding, the nascent lithium carbonate particles are in an environment with high concentration of carbonate anions and low concentration of sulfate anions, so that the surface is more likely to adsorb carbonate anions rather than sulfate anions, and only individual sites adsorb the sulfate anions (and a small amount of silicate anions); due to the characteristic of the single-layer adsorption, after the surface of the lithium carbonate particles is saturated with the adsorbate carbonate anions, it will no longer adsorb the electronegative sulfate and carbonate anions. Since the carbonate anions adsorbed on the lithium carbonate are not easy to reversely desorb, but will quickly adsorb free electropositive lithium ions (followed by sodium ions), the carbonate anions and lithium ions are cross-adsorbed, lithium carbonate particles can quickly grow in an environment with lower concentration of sulfate anions, and the amount of the adsorbed sulfate anions is substantially reduced compared with that in a "forward feeding" process.

The "without mother liquor circulation" substantially reduces the concentration of sulfate anions in a thermal precipitation reaction slurry system, and superpose the beneficial effect of reducing the adsorption of the sulfate anions in lithium carbonate particles.

A layer of carbonate anions adsorbed by the precipitated lithium carbonate particles partly adsorbs sodium ions to form sodium carbonate, which will not cause too much trouble: on one hand, these carbonate anions can chemically adsorb lithium ions dissociated from the continuously added lithium sulfate to further generate lithium carbonate with much lower solubility than sodium carbonate and more firm bonding by chemical reaction, so that lithium carbonate particles become larger, and sodium ions which are excluded and exchanged by the lithium ions added into a thermal precipitation system later can be absorbed by free sulfate anions in a reaction solution and transferred into the reaction solution; on the other hand, the sodium carbonate and the lithium carbonate do not generate a complex salt, which has much higher solubility in hot water than lithium carbonate, and can be easily washed out when stirred and washed with hot water in a post-process. Of course, there will also be a small amount of sodium ions that adsorb sulfate anions to form sodium sulfate, which is then deeply coated by lithium carbonate adsorbed thereon. The product lithium carbonate is sometimes found to contain slightly less sodium than the equivalent amount of sulfate anions, indicating that there are trace amount of sulfates of other metal elements, such as calcium, coated. These sulfate anions are more difficult to wash out.

The "reverse feeding" process, by means of the preferential complexing of high concentration of adsorbate carbonate anions with lithium ions in nascent lithium carbonate particles, prevents adsorbate sulfate anions from complexing with a large number of adsorbent lithium ions in the lithium carbonate particles and thus being coated, and thus successfully reduces the content of sulfate anions in the product on an industrial production scale. After the "reverse feeding" (in combination with the "supplementary impurity removal by pre-precipitation") is adopted, deionized water only needs to be added to the crude lithium carbonate in a ratio (mass ratio) of 1:2 to 1:3 for the thermal stirring washing-centrifuging for 3 times to obtain a product with 0.15%-0.20% sulfate anions.

The purpose of performing the "slowing, stirring, heating and aging" operation in the current thermal precipitation procedure of crude lithium carbonates is to obtain lithium carbonate particles with large particle size, so as to reduce the adsorption and the coating of sulfate anions. The principles on which it is based include: 1, the Langmuir theory, means that the smaller the surface of the adsorbent, namely the larger the particle size, the lower the adsorption capacity; 2, the Kelvin formula, means that aging enables small crystals to convert automatically into large crystals (the system tends to be stable due to the reduced free energy), and in the conversion process, under the stirring and heating conditions, part of the adsorbed and coated sulfate anions and sodium ions can be released into the reaction solution; however, the sulfate anions adsorbed by the nascent lithium carbonate particles have been deeply coated in the early stage of the reaction, therefore, the amount of the sulfate anions adsorbed and coated in the lithium carbonate particles is still very large in a dynamic reversible state of adsorption-desorption in the later stage of the reaction even if the concentration of the sulfate anions in the reaction solution has been very high, and thus a new technological breakthrough is still needed to solve this problem; 3, the Le Chatelier's principle, means that increasing the temperature is conducive to the desorption.

In the initial stage of the thermal precipitation of lithium carbonate, particularly under the conditions of fast feeding and weak stirring, the thermal precipitate is often very viscous for the following reasons: a. Four main ions in the lithium sulfate and sodium carbonate solutions used in a thermal precipitation reaction have high concentrations and strong reaction tendency, and lithium ions of nascent lithium carbonate particles are easily coordinated with carbonate, sulfate and silicate anions to form complex salts, so that outside the lithium ions, a layer of acid anions forms, outside the layer, a layer of lithium ions forms, followed by a layer of acid anions, over and over again, and they rapidly adhere to one another to form a cluster; these lithium ions will also adhere to the inner wall of the glass-lined reactor or stirrer (as well as laboratory glassware, tools) made of silicates, which is a rapid entropy-increasing process with great driving force. However, as time goes by, the cluster is loosened and broken due to continuous adjustment of various internal chemical bonds, the sulfate anions in the cluster are continuously bound to sodium ions and dissolved in hot water, and lithium carbonate particles are continuously separated out, but it is hard to avoid such a case that a few or a very few clusters still adhere to the inner wall of the reactor or stirrer, or are retained in the crude lithium carbonates, resulting in a relatively high content of sulfate anions in a product and other problems. Therefore, this should be avoided to the utmost extent. b. If the desiliconization of the lithium sulfate and sodium carbonate solutions is not sufficient, lithium silicate is generated during the thermal precipitation, which is very viscous and will increase the self-adhesion of lithium carbonate particles to make them easy to agglomerate after being dried. This is because liquid lithium silicate has a characteristic of never re-dissolving in water once dehydrated, and is very different from sodium water glass, i.e. sodium silicate (for example, liquid lithium silicate, as a concrete sealant, is very firm after being dried and cured in construction, and is not afraid of long-term soaking in water).

Therefore, the lithium sulfate leaching solution and the sodium carbonate solution both need to be strictly and effectively desiliconized, such that the solutions can be confirmed to be a completely purified solution. The "supplementary impurity removal by pre-precipitation" rescue method is better to be on standby at any time, but it should be noted that during the spraying of a small amount of precipitant sodium carbonate in a mist form through pressurized sprinkler feeding ports arranged reasonably at a proper speed under the condition of vigorous and effective stirring, the reaction solution system should be kept at pH<7.0; and the inner wall of the stainless steel reactor and the surface of the stirrer should be smooth and free of scratches or spot welding slags, so as to prevent the lithium carbonate particles from being bonded.

Based on the principles of the adsorption and desorption, the third technique "high-efficiency desorption" of the invention is developed in a reasonable way, by which most of the sulfate anions deeply coated with lithium carbonate particles in the initial stage of the thermal precipitation can be successfully desorbed, so that the content of the sulfate anions is further and substantially reduced to 0.03%-0.02% for the industrial-grade lithium carbonate and 0.008% for the battery-grade lithium carbonate.

Here, the supplementary explanations are given for the technical principle in paragraph that by properly increasing the feeding speed of the completely purified lithium sulfate solution and moving the thermal aging duration backward to the thermal precipitation process, the crude lithium carbonate with small particle size is obtained by the "thermal precipitation with small temperature increases and thermal stirring washing" procedure in the initial stage, and then the refined lithium carbonate with large particle size and extremely low content of sulfate anions generated by recrystallization is obtained by the thermal aging in the "medium-high temperature strong desorption" procedure in the later stage: in a liquid-solid phase system, the general technical principle of providing the conditions of "diluting, slowing, stirring, heating and aging" to obtain crystals with large particle size, so as to reduce the total surface area of the crystals and reduce the adsorption of other harmful impurities on the surfaces of the crystals is also applicable to the crude lithium carbonate obtained by the thermal precipitation reaction of lithium sulfate solution with sodium carbonate solution. The "diluting", although can reduce the concentration of the sulfate anions in a thermal precipitation reaction solution system, which is beneficial to reducing the absorption of the sulfate anions by lithium carbonate particles; however, it will reduce the first pass yield of the lithium carbonate, and the low concentration of sodium sulfate mother liquor is unfavorable for recovering the byproduct sodium sulfate; the "slowing, stirring, heating and aging" conditions has been adopted in the stage of reducing the content of sulfate anions to 0.20% for the industrial-grade lithium carbonate and 0.08% for the battery-grade lithium carbonate, and proved to be effective and free of errors. However, in order to further reduce the content of sulfate anions to a large extent to 0.03%-0.02% for the industrial-grade lithium carbonate and 0.008% for the battery-grade lithium carbonate, or even to produce a 4N-grade product, the "slowing" operation needs to be modified to "moderately accelerating" operation, and the "aging" operation needs to be moved backward to the subsequent process to obtain crystals with small particle size first.

What does that mean? In the high concentration of thermal precipitation reaction solution system, impurities such as sulfate anions and sodium ions in the peritectic crystal formed in the initial stage of the thermal precipitation are located at the core of the large crystal, and are extremely difficult to release by the thermal stirring washing, or even the "strong desorption" (the thermal stirring washing is also a desorption operation substantially, but with much less strength than the "strong desorption"), and it is mainly these sulfate anions that contribute to the content of 0.08% for the current battery-grade lithium carbonate standard. Therefore, the method of firstly obtaining crystals with small size in the thermal precipitation procedure is performed to lay a technical foundation for the subsequent "medium-high temperature strong desorption" process, so that the technical problem can be solved.

Since the distance between the core and the outer surface of the crystal with small size is small, and sulfate radicals and other impurities in the peritectic crystal are buried shallowly, which belongs to "shallow coating", in the "medium-high temperature strong desorption" and thermal aging operation, most of the impurities are easily released in the liquid phase along with the process of the recrystallization of the crystal with small particle size into a crystal with large particle size in an environment of very low concentration of impurities such as sulfate radicals caused by deionized water with a mass that is 5-6 times or more the mass of the crystal with small particle size. Therefore, this technical foundation can improve the reliability of the "medium-high temperature strong desorption" for further substantially reducing the content of sulfate radicals, moderately reduce the operation pressure, shorten the pressure operation, reduce the pressure reactor volume, and reduce the equipment investment.

The method is completely not concerned about the condition that the number and the total surface area of the lithium carbonate particles with small particle size are substantially increased in the "thermal precipitation with small temperature increases" procedure, and impurities such as sodium carbonate and sulfate anions are temporarily and mostly adsorbed on the outer surface layer of the lithium carbonate particles with small particle size, because the impurities are "buried" shallowly, most of which is easily separated from the crude lithium carbonate-1 particles during the first thermal stirring washing-centrifuging operation of the crude lithium carbonate, and a small quantity of residues are not sufficient to resist the strong desorption capacity of the "medium-high temperature strong desorption", and will be released together with the impurities such as the sulfate anions which are deeply coated.

IV. DESCRIPTION OF THE DRAWINGS

Figure 1:
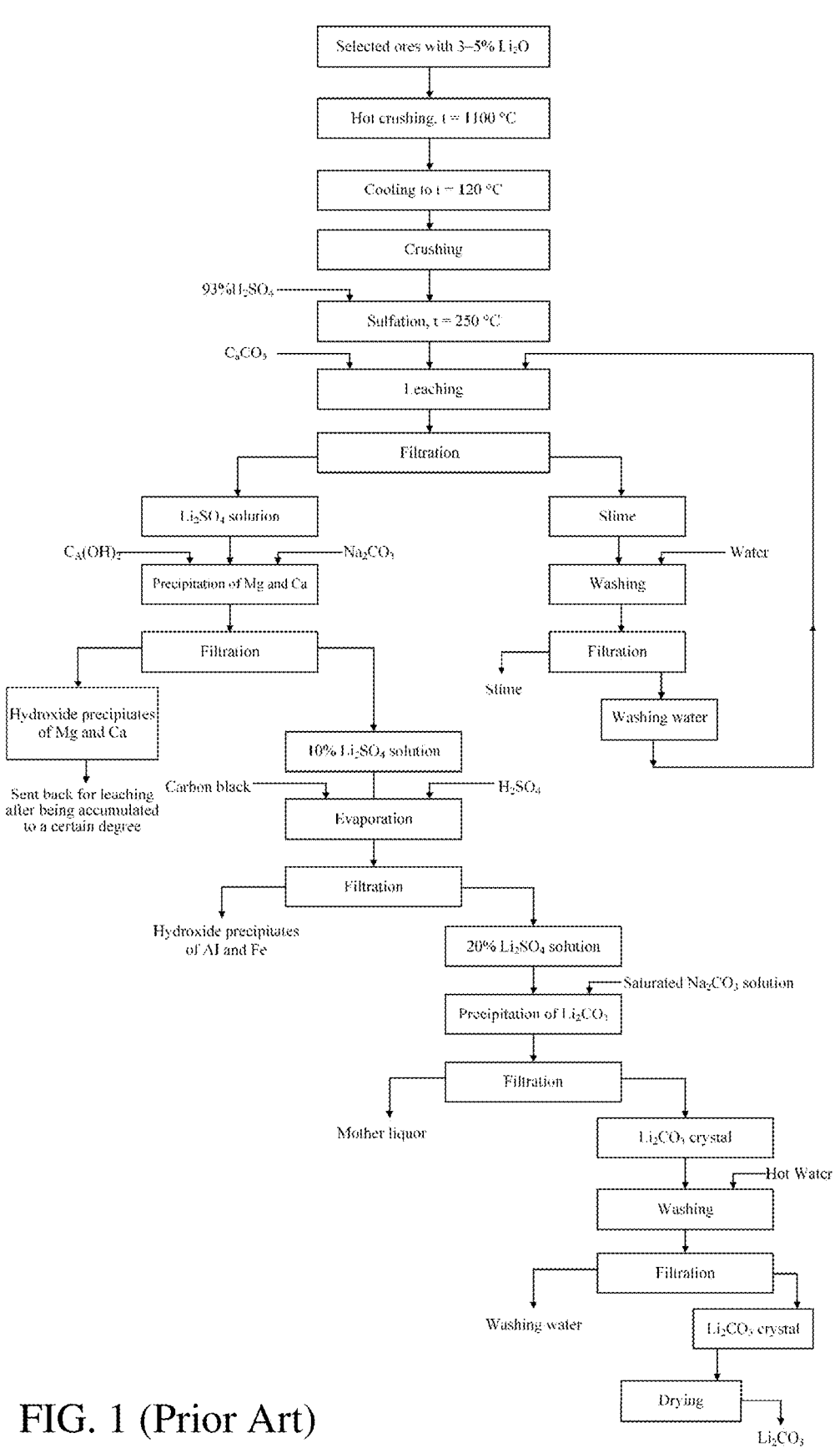
FIG. 1 is a schematic diagram of a process flow of a spodumene-sulfuric acid process of the former Lithium of America corporation.

The drawings 1-4 are detailed as follows: FIG. 1 is a drawing from Aus Troche C., The Chemistry and Technology of Lithium [M]. Beijing: China Industrial Press, May 1965, first edition, page 160. Combining with the written part of this book, it can be clearly demonstrated that the thermal precipitation operation using the completely purified lithium sulfate and sodium carbonate solutions is performed according to the "forward feeding" process.

Figure 2:
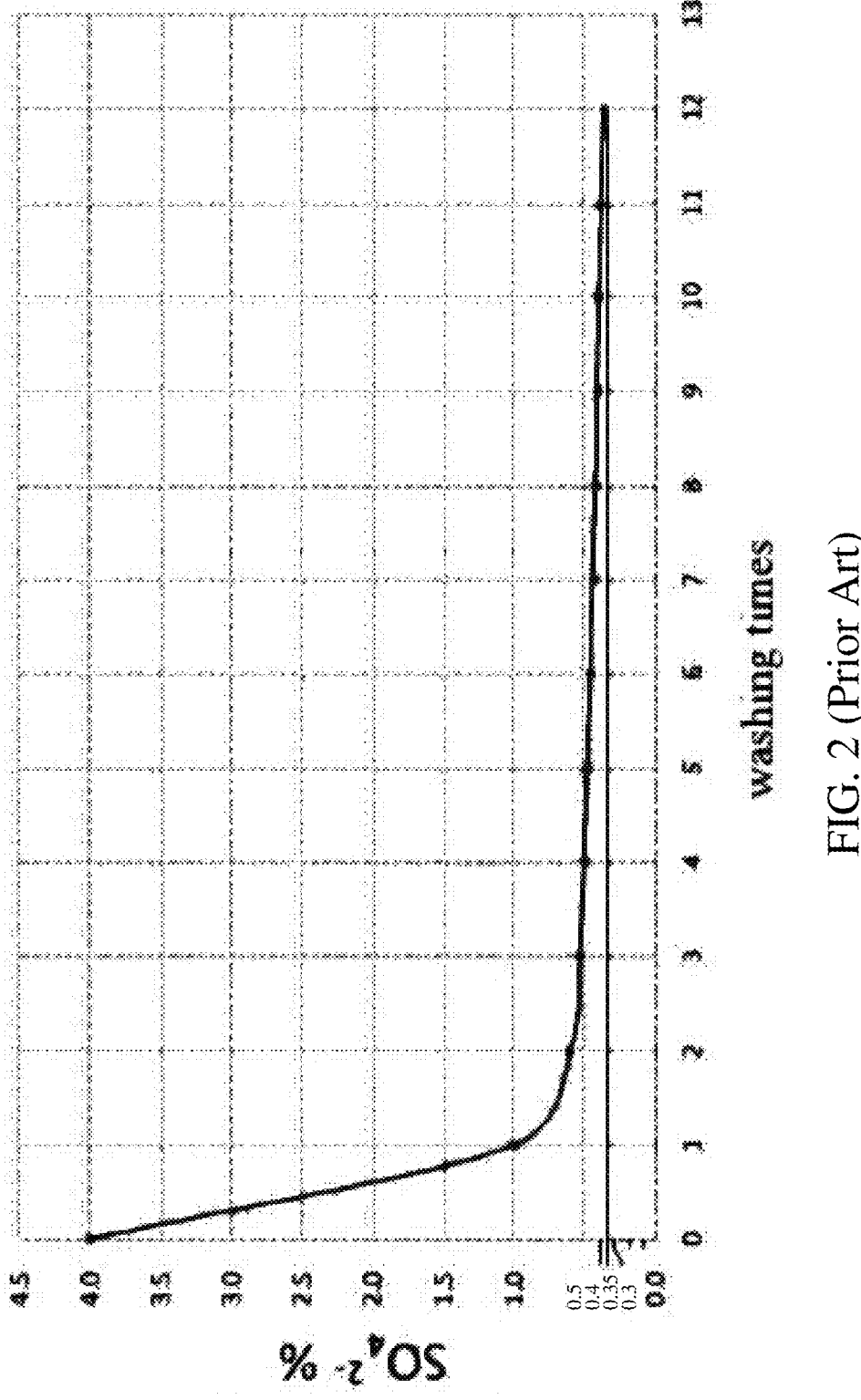
FIG. 2 shows a washing curve of sulfate anions of a pilot product according to the spodumene-sulfuric acid process of the former Lithium of America corporation.

FIG. 2 shows a washing curve of sulfate anion of a pilot product according to the "forward feeding" procedure of the thermal precipitation in the spodumene-sulfuric acid process for producing lithium carbonate of the former Lithium of America corporation by the inventor of the present application in the initial stage of leading the small-scale industrial production by the spodumene-lithium sulfate process in 1978-79-80. The curve clearly shows that the content of sulfate anions is extremely difficult to further reduce after it is reduced to about 0.35% by washing, fully indicating that the biggest shortcoming of this conventional process is the high content of sulfate impurity. The washing conditions are as follows: crude lithium carbonate:distilled water=1:1.5, the temperature is 90-95° C., the stirring time is 30 minutes, and the SS-800 three-legged centrifuge is used for spin-drying at 1,000 rpm/min.

Figures 3, 4:
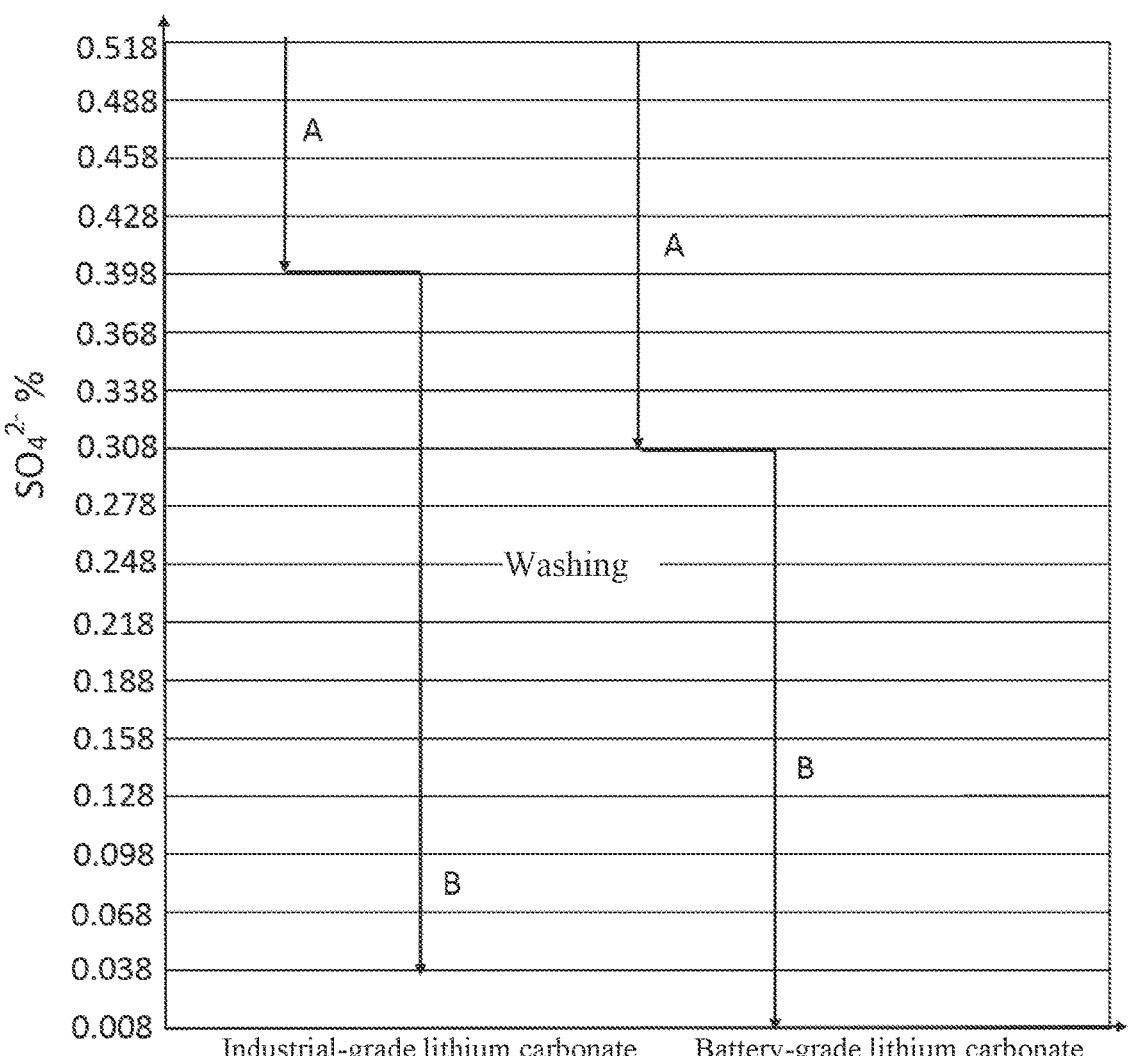
FIG. 3 shows the solubility data for lithium phosphate, lithium fluoride, lithium carbonate in water.
FIG. 4 shows the decline curves of the content of sulfate anions in lithium carbonates after the implementation of the invention.

FIG. 3 shows the solubility data for lithium phosphate, lithium fluoride, and lithium carbonate in water, which presents great differences of an order of magnitude sequentially, indicating that lithium recovery from lithium-containing sodium sulfate mother liquor is highest in a lithium phosphate way.

FIG. 4 shows the decline curves of the content of sulfate anions after the implementation of the "reverse feeding without mother liquor circulation", "supplementary impurity removal by pre-precipitation" and "high-efficiency desorption" techniques of the invention, both showing a precipitous drop. In the figure, a character A represents the "thermal precipitation with small temperature increases" stage, and a character B represents the "thermal stirring washing with small temperature increases", the "medium-high temperature strong desorption" and "hydrocyclone separation" stages; the horizontal line represents that the crude lithium carbonate-1 of the product in the stage A is transferred to the operation in the stage B to produce refined lithium carbonate; the left curve is for the industrial-grade lithium carbonate and the right curve is for the battery-grade lithium carbonate.

V. DETAILED DESCRIPTION

The invention will be further described with reference to specific embodiments. It should be understood that the following examples are merely exemplary illustration and explanation of the invention, and should not be construed as limiting the protection scope of the invention. All techniques implemented based on the aforementioned content of the invention are included in the protection scope of the invention.

Taking the direct production of lithium carbonate by the spodumene-sulfuric acid process as an example: when the technical schemes of the invention are implemented, the current impurity removal method before the "thermal precipitation with small temperature increases and thermal stirring washing" procedure remains basically unchanged, and the "supplementary impurity removal by pre-precipitation" technique of the invention can be used for supplement; the "thermal precipitation with small temperature increases and thermal stirring washing" procedure must adopt the "reverse feeding without mother liquor circulation" technique; the current techniques for drying, crushing, metering and packaging the refined wet lithium carbonate remain unchanged; all detection methods remain unchanged; the method for determining the end point of the "medium-high temperature strong desorption" in paragraph [0046] only relates to sampling measures and a method for calculating the content of sulfate anions in solid-phase lithium carbonate, and does not relate to the change of the detection method for sulfate anions.

Here, the specific embodiments will be described in combination with the 4 combinations of the three techniques of the invention described in paragraphs [0014-0015]:

① The specific embodiment of producing the current industrial zero-grade lithium carbonate with 0.20% sulfate anions according to the combination 1:

The "supplementary impurity removal by pre-precipitation" in paragraph [0022] is performed as follows:

A purified lithium sulfate solution is added into a thermal precipitation reactor, the stirring is started, and a small amount of purified sodium carbonate solution is sprayed in a mist form at a medium speed under the pressure of 0.05 MPa through pressurized sprinkler feeding ports; the feeding is stopped once the reaction solution become turbid followed by the precipitation of white fine substances (with yellow and red light when iron content substantially exceeds the acceptable level) as detected by naked eyes and a turbidity meter, and the stirring is continued for a few minutes; the sample is taken and finely filtered, and then measured for the content of impurities such as iron, aluminum, magnesium, calcium, and heavy metals, and if the content of impurities is unqualified, a small amount of sodium carbonate is sprayed, and the sample is detected again until the content of impurities is qualified, after which the stirring is continued for another 15 min.

The qualified purified lithium sulfate solution is filtered, and the initial filtrate is temporarily added into a small turbid solution tank (the volume of which is about 20% of the volume of the purified lithium sulfate solution), and filtered again in a circular mode until the resulting filtrate is detected to be qualified, such that the filter cake is regarded as successfully bridged, and the filtrate is confirmed to be a completely purified solution.

Then, the specific operations of the "reverse feeding without mother liquor circulation" described in paragraphs [0018]-[0019] are performed to produce the current industrial zero-grade lithium carbonate with 0.20% sulfate anions. The equivalence ratio of the sodium carbonate to the lithium sulfate should be 1.05.

For manufactures with advanced processes, equipment and instrument of production and detection, and management, on the basis of their current techniques, the current industrial zero-grade lithium carbonate can be simply produced by the "reverse feeding without mother liquor circulation" process with medium-low concentration of completely purified lithium sulfate solution with 10% or slightly more sulfate anions without combination with the "supplementary impurity removal by pre-precipitation".

② The specific embodiment of producing the industrial "new first-grade" lithium carbonate according to the combination 2:

The "new first-grade" lithium carbonate with 0.10% sulfate anions can be produced by applying the operations of the "reverse feeding without mother liquor circulation" process in paragraphs [0018]-[0019], the "thermal precipitation with small temperature increases and thermal stirring washing" operation of the "high-efficiency desorption" process in paragraphs [0041]-[0042], and optional operations of the "supplementary impurity removal by pre-precipitation" process in paragraph [0077] if necessary.

③ and ④ The specific embodiment of producing the industrial "new zero-grade" and "new battery-grade" lithium carbonates according to the combinations 3 and 4:

According to the quality of the purified lithium sulfate solution, if the "supplementary impurity removal by pre-precipitation" is required, the purified lithium sulfate solution is purified supplementarily as per the embodiment described in paragraph [0077].

As described in paragraphs [0041]-[0042], the completely purified sodium carbonate solution is added to a reactor for the thermal precipitation with small temperature increases, and heated; a manhole on the reactor is covered, and the reactor is sealed after air in the reactor is completely driven out; when the reactor is heated to a selected temperature, such as 105° C. (0.13 MPa) for the industrial "new zero-grade" lithium sulfate and 118° C. (0.18 MPa) for the industrial "new battery-grade" lithium sulfate, the stirrer is started and is kept working effectively, the completely purified lithium sulfate solution is sprayed into the reaction in a mist form under a pressure of 0.1-0.3 MPa at a speed twice as fast as that of the original process for obtaining crude lithium carbonate particles with large particle size through pressurized sprinklers arranged at multiple points, so as to firstly obtain the crude lithium carbonate-1 with small particle size. Once the feeding is completed, the reactor is de-pressurized (a pipeline should be connected to recover steam heat), after which the reaction solution is immediately discharged, and centrifuged and rinsed to obtain the crude lithium carbonate-1, so that the "thermal precipitation with small temperature increases" is completed. The crude lithium carbonate-1 is immediately transferred while hot into a reactor for the thermal stirring washing with small temperature increases into which deionized water at 90-95° C. with a mass that is 3 times (for the industrial "new zero-grade" lithium carbonate) or 4 times (for the "new battery" lithium carbonate) the mass of the crude lithium carbonate-1 has been added with the stirring started; a manhole on the reactor is covered, and the reactor is sealed after air is completely driven out, heated to a selected temperature such as 105° C. (0.13 MPa) for the industrial "new zero-grade" lithium carbonate and 120° C. (0.20 MPa) for the "new battery-grade" lithium carbonate, and subjected to the thermal stirring washing for 15 minutes, then de-pressurized, and after the reactor is cooled to 95° C., the reaction solution is discharged, centrifuged and rinsed to obtain the firstly washed crude lithium carbonate-2 with the content of sulfate anions reduced to 0.30%-0.20% for the industrial "new zero-grade" lithium carbonate and 0.15%-0.10% for the "new battery-grade" lithium carbonate for later use, so that the "thermal stirring washing with small temperature increases" operation is completed.

Lithium salts such as crude lithium carbonate or lithium phosphate and mirabilite or anhydrous sodium sulfate are recovered from the primary sodium sulfate hot mother liquor generated in the "thermal precipitation with small temperature increases" process according to the operation of the "without mother liquor circulation" process.

Under the low-speed stirring, the crude lithium carbonate-2 is transferred while hot into a reactor for the medium-high temperature strong desorption into which deionized water (for the battery-grade lithium carbonate, deionized water with the purity of 18 MΩ·cm, self-made and preheated to 90-95° C. is adopted) with a mass that is 3-4-5 times (industrial-grade) or 5-6 times (battery-grade) that of the crude lithium carbonate-2 has been pumped with the low-speed stirring started; the reactor is heated, and completely sealed after air in the reactor is driven out; when the industrial-grade lithium carbonate is to be produced, the reactor is heated to 144-159° C. (corresponding to the saturated steam pressure of 0.4-0.6 MPa in the reactor), and when the battery-grade lithium carbonate is to be produced, the reactor is heated to 165-170-180° C. (corresponding to the saturated steam pressure of 0.7-0.8-1.0 MPa in the reactor), and the "medium-high temperature strong desorption" and the thermal aging operation are continued for 1 hour or more with low-speed stirring, temperature and pressure maintained, so as to obtain lithium carbonate crystals with large particle size formed by recrystallization; during the process, a small amount of liquid phase is extruded out through a specially arranged sampling pipe opening at regular intervals of time for rapid detection of the content of sulfate anions (continuous detection on-line is performed as far as possible), and the content of residual sulfate anions in the lithium carbonate in the reactor is calculated accordingly; after the content is qualified, a heating valve is closed, the low-speed stirring is maintained, cooling water is slowly and carefully introduced into a jacket to cool the reactor, when the pressure in the reactor is reduced to 0.05-0.06 MPa, the stirring speed is increased until the slurry is under a strong stirring condition, and the slurry is pumped into a hydrocyclone separator with the speed controlled to continuously separate the liquid phase from the solid phase; the separated liquid phase contains slightly water soluble impurities and particulate water insoluble impurities which are adsorbed and coated in the crude lithium carbonate, so that it cannot be circularly used for the initial operation of the thermal precipitation of the crude lithium carbonate, and should be sent back to the leaching process, or sent back to the leaching process after the filter cloth and equipment are cleaned; only part of the separated liquid phase which is fully coagulated and sub-jected to fine filtration is allowed to be mixed into deionized water for the thermal stirring washing of the crude lithium carbonate-1 to produce industrial-grade products, and pro-hibited in the subsequent processes. After the solid phase is subjected to the centrifuging-washing, the refined wet lithium carbonate is obtained. For the industrial "new first-grade" and "new zero-grade" lithium carbonates, the content of sulfate anions should be 0.10% and 0.03%-0.02%, respec-tively, and for the "new battery-grade" lithium carbonate (subjected to the thermal stirring washing one more time if necessary), the content of sulfate anions can be expected to reach 0.010%-0.008%-0.005%, or even can reach the limit of the main content of the 4N-grade lithium carbonate under the optimal conditions.

The "high-efficiency desorption" of the invention can be naturally extended to the following similar technical fields, in addition to being used to substantially reducing the content of impurity sulfate anions in the lithium carbonate precipitated from the lithium sulfate solution and the sodium (potassium) carbonate solution as exemplified: efficiently removing the impurities that are difficult to remove by conventional washing methods due to chemical adsorption and deep coating in the core of the crystals (or particles) of the insoluble or slightly soluble target product separated out by the precipitation reaction of two or more soluble inor-ganic substances, and therefore, these are all included in the technical scope of the invention.

The invention claimed is:

1. A method for preparing lithium carbonate from lithium sulfate and sodium carbonate or potassium carbonate, com-prising the following steps:

S1: adding a 20 wt % lithium sulfate purified solution to a sodium carbonate or potassium carbonate purified solution at 90-95° C. to obtain crude lithium carbonate-1; separating the crude lithium carbonate-1 to obtain a primary hot mother liquor;

S2: cooling the primary hot mother liquor to −15° C. to crystallize mirabilite; separating the mirabilite by centrifugation to obtain a secondary cold mother liquor;

S3: concentrating the secondary cold mother liquor, to precipitate and separate crude lithium carbonate-1 again, and to obtain a tertiary hot mother liquor;

S4: combining the tertiary hot mother liquor with the primary hot mother liquor, and repeating steps S2-S3 to reduce the sulfate anion content in the liquid system;

S5: combining the crude lithium carbonate-1 obtained in steps S1 and S3, then transferring to deionized water which is 3 or 4 times the mass of the crude lithium carbonate-1 and has a temperature of 90-95° C.; heating to 115° C., stirring and washing for 15 minutes, then centrifuging and rinsing to obtain crude lithium carbonate-2;

S6: adding the crude lithium carbonate-2 obtained in step S5 to deionized water which is 3-6 times the mass of the crude lithium carbonate-2 and is in a desorption reactor; heating to 159-188° C., desorbing sulfate anions adsorbed on the crude lithium carbonate-2 into the deionized water under stirring, and performing thermal aging for not less than 1 hour, to obtain a thermally aged slurry; and S7: adding the thermally aged slurry obtained in step S6 to a hydrocyclone to separate the liquid and solid phases.

2. The method according to claim 1, wherein in step S1: adding a saturated sodium carbonate or potassium carbonate purified solution into a reactor, heating to 105-120° C.; pumping the lithium sulfate purified solution which has been preheated to 90-95° C. into the reactor in a form of sprayed droplets through multi-point arranged showers to precipitate the crude lithium carbonate-1; then centrifuging to separate the crude lithium carbonate-1.

3. The method according to claim 1, wherein in step S1, the molar ratio of sodium carbonate or potassium carbonate to lithium sulfate is 105%.

4. The method according to claim 1, wherein before step S1: heating a 20 wt % lithium sulfate purified solution to 80-90° C.; under online detection by a turbidimeter, adding a small amount of sodium carbonate purified solution into the lithium sulfate purified solution; stopping addition immediately once the lithium sulfate purified solution becomes turbid and fine white, yellowish or reddish solids precipitate out; continuing to stir for 15 minutes and filtering, then detecting the contents of iron, aluminum, magnesium, calcium and heavy metals in the filtrate; if the contents are beyond the national standards, spraying a small amount of sodium carbonate purified solution again and re-detecting until the standards are met, then filtering.

5. The method according to claim 1, wherein the desorption reactor in step S6 is selected from a vertical cylindrical desorption reactor or a spherical desorption reactor equipped with a stirrer and a heating and cooling jacket; wherein the desorption reactor adopts a jacketed heating and cooling means, and direct steam heating is not allowed to avoid contaminating the content; and wherein the inner wall of the desorption reactor that comes into contact with the content is made of titanium, 0Cr18Ni9Ti stainless steel, 0Cr18Mo2Ti stainless steel, glass or polytetrafluoroethylene (PTFE).

6. The method according to claim 1, wherein in step S1, the 20 wt % lithium sulfate purified solution is derived from spodumene, lepidolite, primary lithium carbonate from carbonate salt lake lithium ore, zinnwaldite, amblygonite, petalite or lithium-containing waste.

* * * * *